INVENTOR
JOHN GORDON HARDWICK

Sept. 1, 1964  J. G. HARDWICK  3,146,962
FILAMENT WINDING MACHINE FOR MANDREL HAVING DOME-SHAPED ENDS
Filed March 5, 1962  7 Sheets-Sheet 4

INVENTOR
JOHN GORDON HARDWICK

BY Cushman, Darby & Cushman
ATTORNEYS

Sept. 1, 1964    J. G. HARDWICK    3,146,962
FILAMENT WINDING MACHINE FOR MANDREL HAVING DOME-SHAPED ENDS
Filed March 5, 1962                                    7 Sheets-Sheet 7

INVENTOR
JOHN GORDON HARDWICK
ATTORNEYS

United States Patent Office 3,146,962
Patented Sept. 1, 1964

3,146,962
FILAMENT WINDING MACHINE FOR MANDREL HAVING DOME-SHAPED ENDS
John Gordon Hardwick, Broadwaters Heath, Kidderminster, England, assignor to Imperial Chemical Industries Limited, London, England, a corporation of Great Britain
Filed Mar. 5, 1962, Ser. No. 177,271
Claims priority, application Great Britain Mar. 15, 1961
7 Claims. (Cl. 242—2)

The present invention relates to a filament winding machine.

It is particularly concerned with a filament winding machine comprising a rotatable mandrel and a filament guide system carriage which is adapted to move relatively to and fro from one end to the other of the mandrel and parallel to the longitudinal axis thereof and in direct relationship with the speed of rotation of the mandrel and wherein a drive sprocket of said carriage have a common drive, and wherein said carriage is attached by means of a slide block to one link of an endless chain which passes round said carriage drive sprocket and another sprocket at a distance therefrom.

By synchronising the rotation of the mandrel and the traverse of the carriage at a suitable rate it is possible to lay the filaments on the mandrel at a desired and predetermined angle.

In such filament winding machines the laying head is in advance of the lay-point of the mandrel (that is the point at which the filament contacts it during laying) to ensure the filaments retain throughout the same angle of winding.

However, when the carriage motion is reversed to initiate the subsequent laying head traverse, the laying head must be moved through a distance equal to twice the distance which the head is in advance of the lay-point. This tends to create a bight of slack and spoil the symmetry of the windings at the ends of the mandrel. Moreover, if the mandrel has dome-shaped ends which are also wound, the distance between the laying head and the lay-point is increased at the end of the traverse, thereby aggravating the position: as a consequence, the strength of wound bodies, particularly at or near the ends, may be suspect.

The object of the present invention is to provide a filament winding machine having a filament guide system carriage which permits a band of filaments to be applied such that the distance of its laying head from a lay-on-point at an end portion on a rotatable mandrel having dome-shaped ends is substantially no greater than that at any other lay-on-point on the rotatable mandrel.

According to the present invention a filament winding machine comprising a rotatable mandrel having dome-shaped ends and a filament guide system carriage which permits a band of filaments to be applied to the mandrel and which is adapted to move relatively to and fro from one end to the other of the mandrel and parallel to the longitudinal axis thereof and in direct relationship with the speed of rotation of the mandrel and wherein the mandrel and drive sprocket of said carriage have a common drive, wherein said carriage is attached by a slide to a slide block which is attached to one link of an endless chain which passes round said carriage drive sprocket and another sprocket at a distance therefrom, and wherein said slide is parallel to the plane in which said sprockets rotate is characterised in that said filament guide system carriage has mechanism comprising a radius arm operating an extended slide; a parallelogram linkage adapted to swivel a guide comb in a plane parallel to the plane containing the axis of the mandrel and a lay-on-point and wherein said radius arm is contained in a plane parallel to both the aforesaid planes; a slide mechanism adapted to move the guide comb in advance of the lay-on-point; and means adapted to permit the guide comb to rotate in a plane parallel to the tangent-plane to the surface at the lay-on-point; said radius arm being one which comprises a pivot point which remains stationary relative to the mandrel while the guide comb traces its path round the domed end, this path having the same radius as said radius arm which is substantially the same radius as the cylindrical portion of the mandrel, and has its opposite end attached by a pin-joint to the extended slide arm, said slide arm moving with the guide system carriage and said parallelogram linkage being one which has a cross member which is attached to the opposite end to the pivot end, is at right-angles to the radius arm and is linked to the guide comb by a sliding parallelogram linkage to ensure the guide comb remains substantially parallel to the tangent-plane to the surface of the mandrel at the lay-on-point.

Said slide mechanism is preferably linked by means of cables to another slide which performs a simple harmonic motion and is actuated by the slide block attached to the carriage drive chain.

Preferably, means adapted to permit the guide comb to swivel in the manner specified comprises a crank arm to which the guide comb shaft is attached, the crank arm passing through a trunnion which lies on a line passing through the lay-on-point and the axis of the mandrel thereby forcing the guide comb as it slides to swivel as specified.

By way of example a filament guide system carriage of a filament winding machine according to the invention will now be described with reference to FIGURES 1–12 of the accompanying diagrammatic drawings wherein.

Figure 1:
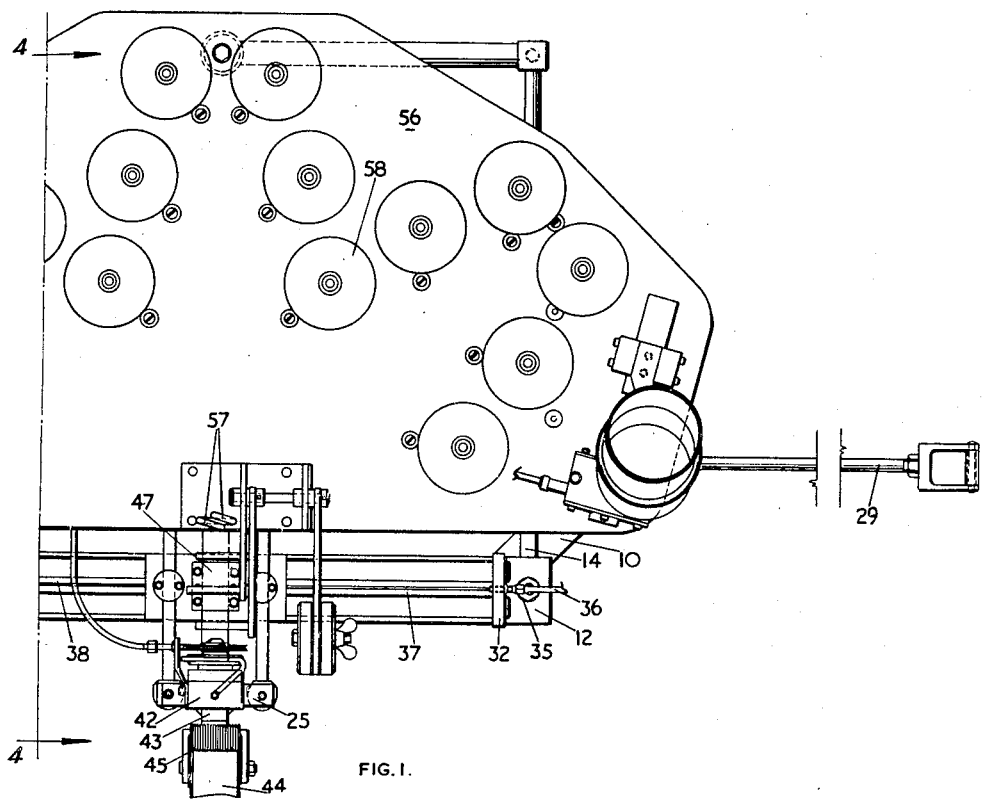
FIGURE 1 is a fragmentary plan view of the guide head system.
Figure 2:
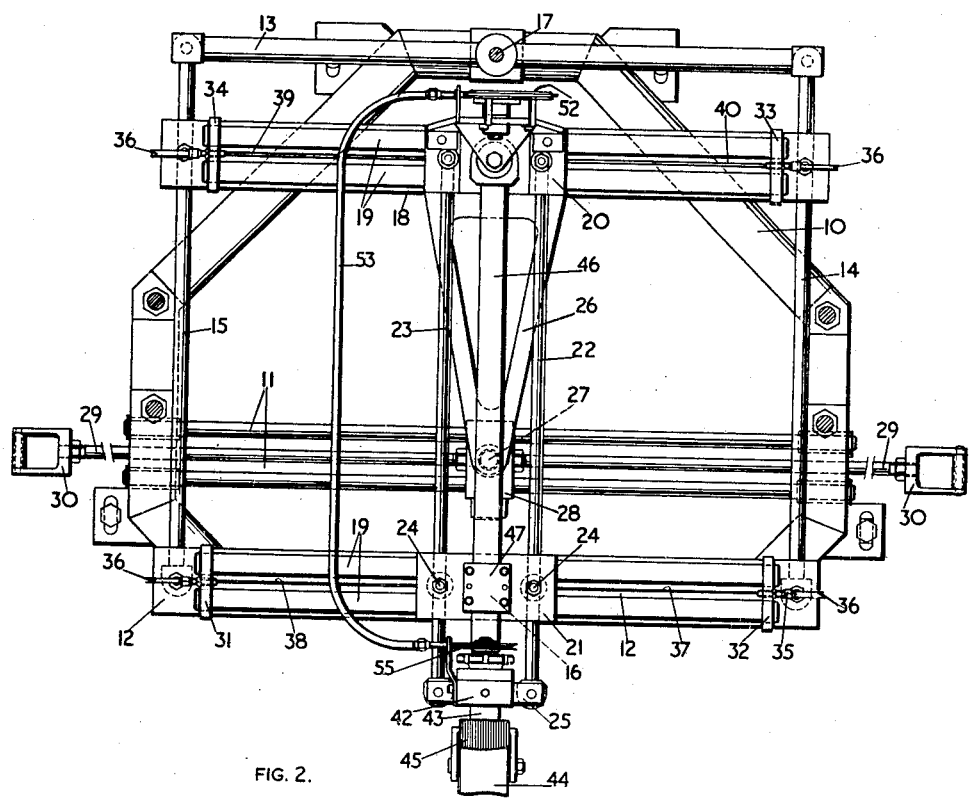
FIGURE 2 is also a plan view of this guide head system but with parts removed for clarity.
Figure 12:
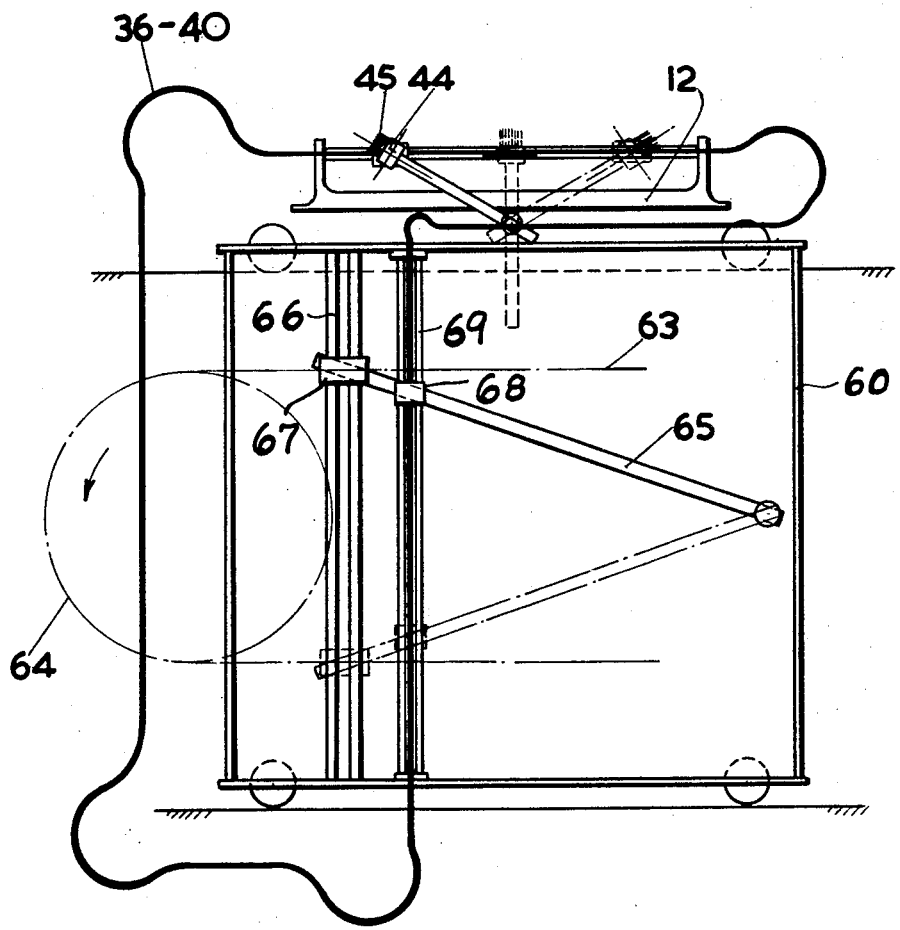
FIGURE 12 is a front elevation illustrating the slide mechanism adapted to move the guide comb in advance of lay-on-point.

In FIGURES 1 and 2 the guide in shown in its central position on its slide. During winding the displacement of the guide is adjusted to suit the helix angle chosen for a particular winding. In FIGURE 12 the guide is shown in its displaced positions.

Referring to the diagrammatic drawings, and particularly to FIGURE 2 thereof, the carriage comprises a rigid framework 10 built up of box section bars. A pair of guide tubes 11 spans the framework and is secured thereto.

Figure 3:
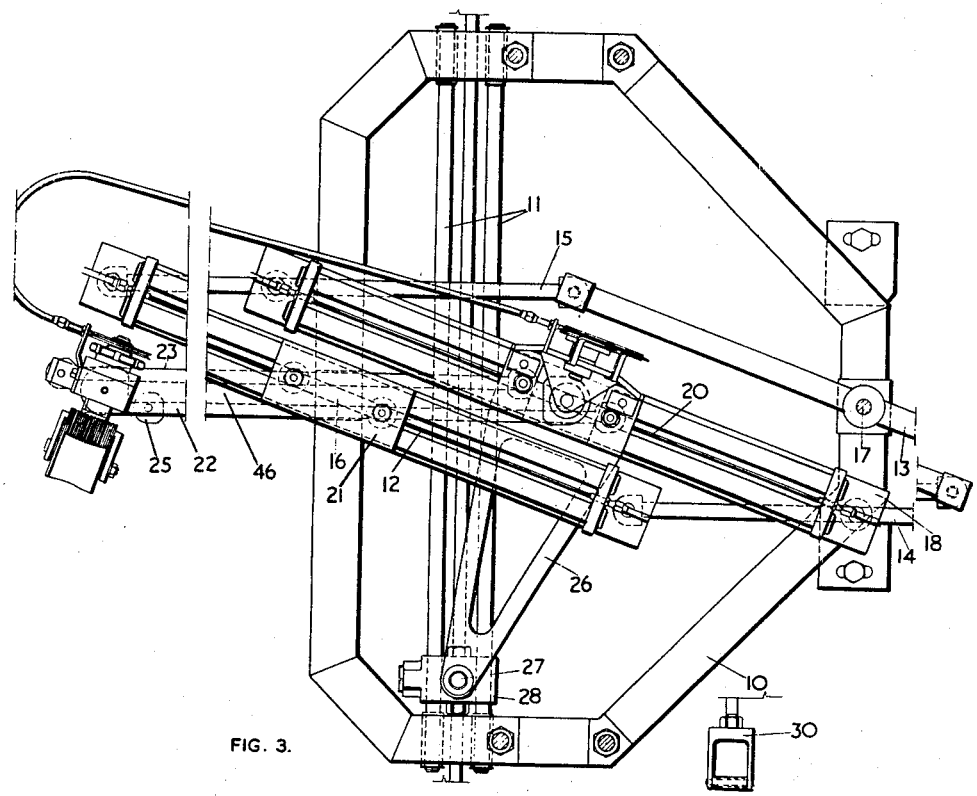
FIGURE 3 is a plan similar to FIGURE 2 and showing parts in different positions to those occupied in FIGURE 2.

A frame parallelogram linkage comprising a channelled bar 12, a main rod 13 lying parallel to bar 12, and a pair of rods 14, 15 pivoted at their ends to the bar 12 and rod 13, is pivoted upon the framework 10 by means of pins 16, 17 which fulcrum bar 12 and rod 13 respectively so that the linkage may swing from a position in which its components define a rectangle (FIGURE 2) to one in which they define a non-rectangular frame parallelogram (FIGURE 3).

A second channelled bar 18, parallel to the first bar 12 is carried upon the linkage and has its ends slidably mounted upon the respective rods 14, 15.

Each of the channelled bars carries a pair of guide tubes 19, and a slide block 20, 21 is slidably mounted on each pair of tubes. Two links 22, 23 are pivoted respectively at opposite ends of slide block 20, extend through transverse bores in pins 24 pivotally secured to opposite ends of slide block 21, and are pivotally secured to opposite ends of a T-piece 25. Slide block 20, links 22, 23 and T-piece 25 together constitute a sliding parallelogram linkage.

The sliding parallelogram linkage is driven between rectangular (FIGURE 2) and diamond (FIGURE 3) configurations by a radius arm 26. The latter is journalled at its apex upon trunnion 27 carried by slider 28 which slides upon the guide tubes 11 secured to the framework 10 and has its two opposite apices bolted to the channelled bar 18 (by bolts 48, FIGURE 4) which is slidable upon the parallelogram linkage.

Slider 28 is secured to a thrust-rod 29 which extends parallel to the guide tubes 11 and beyond the framework 10, each end of the rod terminating at a stirrup 30. Axial movement of the thrust-rod relative to the framework consequently displaces the slider 28 along the guide tubes and swings bar 18 about the axis of trunnion 27 taking the frame parallelogram linkage and the sliding parallelogram linkage into the position shown in FIGURE 3, or the mirror image thereof.

Each of the channeled bars 12, 18 has a lug 31, 32, 33, 34 (FIGURE 2) at each end. The lugs support the guide tubes and have, between the guide tube supporting holes, an aperture in which is accommodated a cable stop and adjuster 35. The outer sheath of a corresponding Bowden cable 36 is held in each stop and the inner wires 37 to 40 of the cables pass through the stops and are anchored to the respective slide blocks 20, 21. By this means, the sliding parallelogram linkage may be moved along the guide tube relative to the frame parallelogram linkage.

Figures 4, 5:
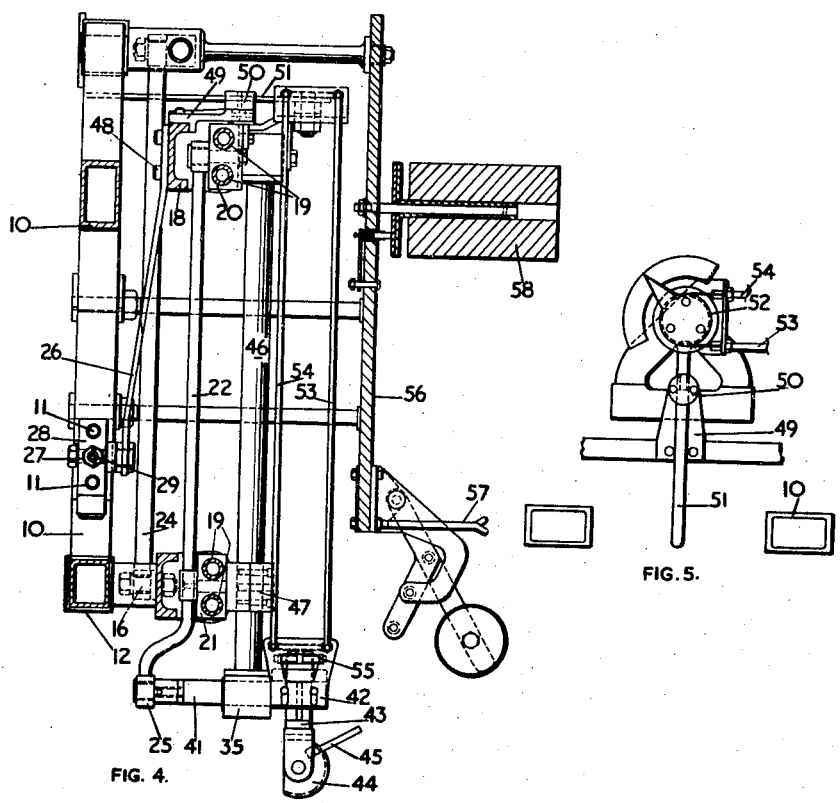
FIGURE 4 is a sectional elevation of the guide head system taken along line 4—4 in FIGURE 1.
FIGURE 5 is a fragmentary end elevation showing part of the guide head system.
Figure 6:
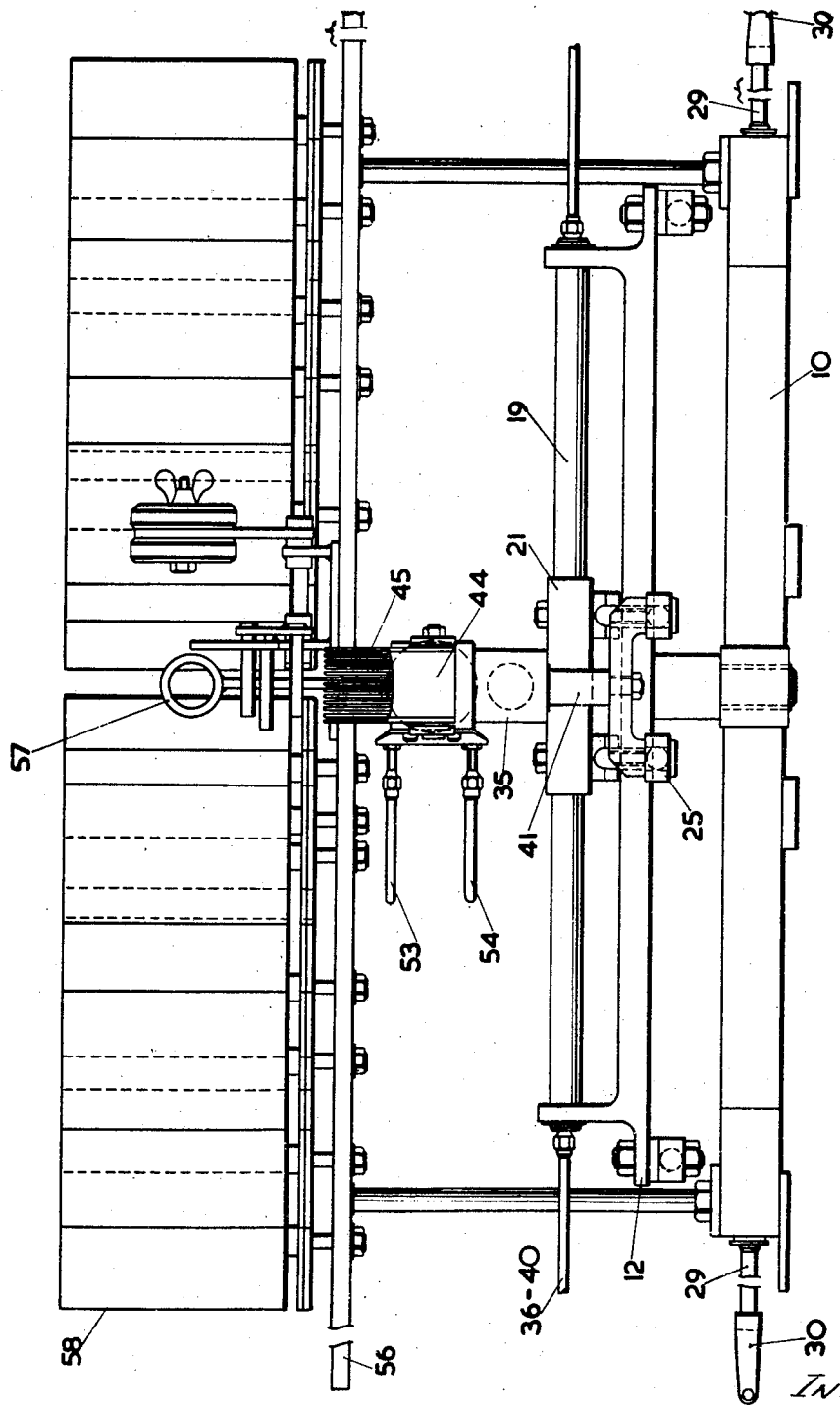
FIGURE 6 is a front elevation of the guide head system.
Figure 7:
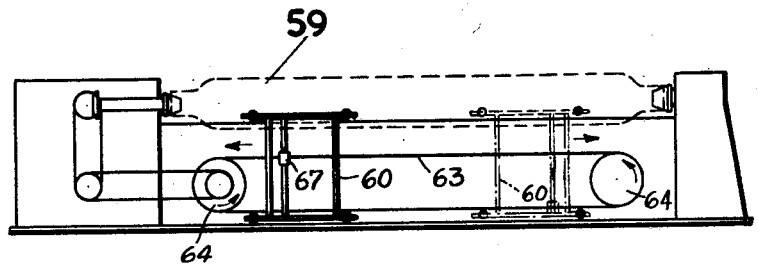
FIGURE 7 is a front elevation illustrating the common drive of mandrel and carriage.
Figure 8:
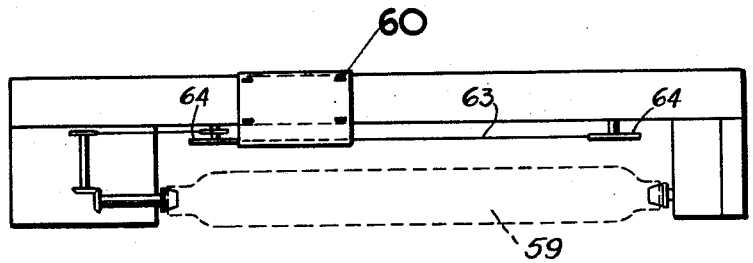
FIGURE 8 is a plan view illustrating the common drive of mandrel and carriage.

The T-piece 25 comprises a head which is pivoted to links 22, 23 (see FIGURE 2) and a stem 41 which extends normal to a plane containing the links (see FIGURE 4). The stem terminates in an eye 42 in which is journalled a shaft 43 carrying a laying head. The laying head comprises a fixed guide 44 and a comb 45.

In order to prevent deflection of the stem 41, an extended slide 46 is journalled to the stem, is guided in a sleeve bearing 47 and is fulcrumed upon slide block 20: the extended slide is parallel to links 22, 23 at all times.

Fixed to the channelled bar 18 adjacent to the end of the radius arm 26 (see FIGURES 4 and 5) is a lug 49 carrying a trunnion 50 with a transverse bore in which a crank 51 is slidably mounted. The crank is coupled to a wheel 52 to which is coupled the ends of two Bowden cables 53, 54 arranged in tandem. The opposite ends of these cables are similarly coupled to a pulley 55 carried by the shaft 43 which mounts the laying head. Movement of the sliding parallelogram linkage along the guide tubes swings the crank and hence turns the laying head through an angle about the axis of the shaft 43.

The carriage is superposed by a cheese-board 56 which carries a number of bobbins or cheeses 58 of filament, and an eye or guide ring 57. Filaments from the individual bobbins are gathered together, passed through the eye, between tines of the comb, over the laying head guide, and on to a mandrel 59 with which the machine is provided, the filaments lying side-by-side in the form of a tape or band.

The carriage is given a reciprocating motion, for example by a chain passing over sprockets, and the rate of the carriage is geared to that of the speed of rotation of the mandrel with which it is associated, so as to achieve a desired pattern of lay of the filaments.

The cables 36 to 40 are coupled to means which will displace the cables near and at the end of a traverse and beginning of a subsequent traverse. For example, when the carriage 60 (FIGURE 12) is attached by a slide 66 to a guide block 67 which is attached to one link of an endless chain 63 driven by a pair of sprockets 64, a lever 65 may be likewise attached to this link and pivoted at its other end upon the carriage; as the link passes over the end sprocket, the lever 65 will be driven through one stroke. Said lever 65 moves slide block 68 along an adjustable slide 69 to transmit via the Bowden cables 36 to 40 the required linear displacement of the sliding parallelogram linkage from end to end of the frame parallelogram linkage as illustrated in FIGURE 12.

Figures 10, 11:
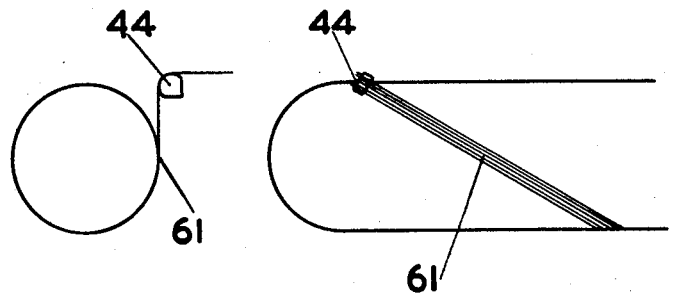
FIGURE 10 is an elevation illustrating the relative position of guide comb or filament guide and lay-on-point.
FIGURE 11 is a side elevation illustrating the relative position of guide comb or filament guide and lay-on-point.

As the mandrel 59 has a cylindrical surface and domed ends, the carriage 60 is driven so that it is parallel to the mandrel's longitudinal axis, with the sliding parallelogram linkage located at the leading end of the parallelogram linkage, and with both linkages in rectangular configurations. The axis of the laying head shaft 43 lies in a plane parallel to the plane containing the axis of the mandrel and the lay-on-point 61 (FIGURES 10 and 11), and the axis of the laying head guide 44 is inclined so that a tangent from the working surface of the guide 44 meets the mandrel surface at the lay-on-point 61 and makes an acute angle with a plane containing the lay-on-point and the mandrel axis forward of the lay-on-point as illustrated in FIGURES 10 and 11.

During the last portion of each traverse and the initial portion of the following traverse, a number of movements take place, in some cases seriatim and in other synchronously; in the interests of clarity, these movements will be described individually.

Figure 9:
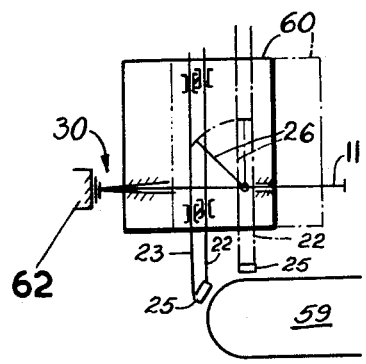
FIGURE 9 is a plan view illustrating the position of the parallelogram linkage near the end traverse and at midstroke.

The first movement is that initiated by engagement of the leading stirrup 30 with an end stop 62 which occurs when the lay-on-point 61 reaches the end of the cylindrical position and the beginning of the domed position as illustrated in FIGURE 9. This engagement initiates swinging of both the frame parallelogram and sliding parallelogram linkages, and it continues until the carriage reaches the end of its travel when the linkages are in extreme angular positions as shown in FIGURE 3. This movement has two separately definable results: firstly it carries the laying head forward from the frame 10 and towards the mandrel, so that as the head scans the curved end surface of the mandrel, the lay distance remains substantially constant or is reduced, and secondly the head is turned round so that the axis of the guide remains substantially parallel to the adjacent mandrel surface. Subsequently, during the first part of the next successive traverse of the carriage, these movements are reversed, so that the parts occupy in succession the mirror image of the positions previously occupied.

The next movement taking place is that of the sliding parallelogram linkage on the frame parallelogram linkage by movement of the cables 36 to 40, and this displacement is synchronised to begin before the end of a carriage stroke, be half completed at the end of said stroke, and completed early in the subsequent stroke. To some extent therefore this movement takes place with movement of the sliding parallelogram and the frame parallelogram linkages initiated by stirrup 30, and results in maximum displacement of the laying head towards the mandrel axis taking place when the sliding parallelogram linkage is in approximately the mid-position along the frame parallelogram linkage and whilst the latter is in its extreme position as shown in FIGURE 3.

Finally, the laying head angle on its shaft is varied synchronously with movement of the sliding parallelogram linkage on the frame parallelogram linkage. This is due to movement of slider 20 relative to the lug 49 and consequent movement of the cables 53, 54. The effect of this is that the laying axis of the head guide 44 moves from its acute angle to the mandrel axis into a position parallel with the mandrel axis (at the end point of travel of the head relative to the mandrel axis) and then into the opposite acute angle as illustrated in FIGURE 12.

By using the machine above described, the bight of slack produced can be considerably reduced, making feasible neater, tighter, more reliable and stronger wound bodies.

In a modification, not shown, the laying head is carried on a telescopically adjustable member so that the maximum distance of the stem from the mandrel axis can be varied.

I claim:
1. Filament winding machine comprising:
    (A) a mandrel rotatable about its longitudinal axis;
    (B) filament guide carriage operative for movement to and fro relative to said mandrel generally parallel to the longitudinal axis thereof, said carriage including:
        (1) a slide mechanism including a carriage slide block,
        (2) a radius arm,
        (3) an extended slide connected to said radius arm,
        (4) a guide comb joined to said extended slide,
        (5) a parallelogram linkage operative to swivel said guide comb in a plane parallel to the plane containing the axis of the mandrel and a lay-on-point, said radius arm being contained in a plane parallel to both aforesaid planes,
        (6) said guide comb remaining substantially parallel to the tangent plane of the mandrel surface at the lay-on point,
        (7) and means for swiveling said guide comb in a tangent plane of the mandrel surface at any lay-on point;
    (C) and drive means for said mandrel and said carriage for moving said carriage at a velocity in direct relationship with the velocity of rotation of said mandrel, said drive means including:
        (1) spaced apart sprockets,
        (2) an endless sprocket chain trained about said sprockets,
        (3) a link of said chain connected to said carriage slide block; said chain link passing about a sprocket at each end of traverse of said carriage.
2. Machine as defined in claim 1 wherein said mandrel has at least one dome-shaped end, and said radius arm includes a pivot connection which remains stationary relative to said mandrel while said guide comb traces a path around the dome-shaped end of said mandrel, said radius arm having substantially the same radius as the mandrel, the end of the radius arm opposite the pivot connection being connected to said shaft means, said extended slide thereby moving with said carriage.
3. Machine as defined in claim 1 wherein said parallelogram linkage includes a cross member at right angles to said radius arm and linked to said guide comb by a second parallelogram linkage to ensure said guide comb remains substantially parallel to the tangent plane of said mandrel surface at said lay-point.
4. Machine as defined in claim 1 including a second slide mechanism, cable means linking said first-mentioned and said second slide mechanism, said second slide mechanism thereby tracing a simple harmonic motion actuated by said carriage slide block.
5. Machine as defined in claim 1 wherein said means for swivelling said guide comb includes a crank arm attached to said guide comb shaft means, a trunnion disposed on a line passing through said lay-on point and the axis of said mandrel, said crank arm passing through said trunnion to thereby force the guide comb to swivel.
6. A filament winding machine comprising:
    (A) a mandrel having at least one dome-shaped end and rotatable about the axis thereof,
    (B) a filament guide carriage including a guide comb, said carriage operative for movement to and fro relative to said mandrel generally parallel to its longitudinal axis, said carriage including a parallelogram linkage for swivelling said guide comb in a plane normal to the surface of said mandrel including said dome-shaped end wherein said guide comb remains substantially parallel to a plane tangent to the surface at said mandrel at the lay-on point, and means for swivelling said guide comb in said tangent plane,
    (C) and means for moving said carriage at a velocity in direct relationship with the velocity of rotation of said mandrel.
7. A filament winding machine comprising a rotatable mandrel having dome-shaped ends and a filament guide system carriage which permits a band of filaments to be applied to the mandrel and which is adapted to move relatively to and fro from one end to the other of the mandrel and parallel to the longitudinal axis thereof and in direct relationship with the speed of rotation of the mandrel and wherein the mandrel and a drive sprocket of said carriage have a common drive, wherein said carriage is attached by a slide to a slide block which is attached to one link of an endless chain which passes round said carriage drive sprocket and another sprocket at a distance therefrom, and wherein said slide is parallel to the plane in which said sprockets rotate characterized in that said filament guide system carriage has mechanism comprising a radius arm operating an extended slide; a parallelogram linkage adapted to swivel a guide comb in a plane parallel to the plane containing the axis of the mandrel and a lay-on-point and wherein said radius arm is contained in a plane parallel to both foresaid planes; a slide mechnism adapted to move the guide comb in advance of the lay-on-point; and means adapted to permit the guide comb to rotate in a plane parallel to the tangent-plane to the surface at the lay-on-point; said radius arm being one which comprises a pivot point which remains stationary relative to the mandrel while the guide comb traces its path round the domed end, this path having the same radius as said radius arm which is substantially the same radius as the cylindrical portion of the mandrel and has its opposite end attached by a pin-joint to the extended slide arm, said slide arm moving with the guide system carriage, and said parallelogram linkage being one which has a cross member which is attached to the opposite end to the pivot end, is at right angles to the radius arm and is linked to the guide comb by a sliding parallelogram linkage to ensure the guide comb remains substantially parallel to the tangent-plane to the surface of the mandrel at the lay-on-point.

References Cited in the file of this patent
UNITED STATES PATENTS
2,607,540    Rekettye _____ Aug. 19, 1952
FOREIGN PATENTS
218,029    Australia _____ Oct. 27, 1958